United States Patent [19]

Stanton

[11] 4,039,198
[45] Aug. 2, 1977

[54] PACKING GLAND

[75] Inventor: Howard F. Stanton, Williamsville, N.Y.

[73] Assignee: J & A Keller Machine Co., Inc., Tonawanda, N.Y.

[21] Appl. No.: 691,469

[22] Filed: June 1, 1976

[51] Int. Cl.² ............................................. F16J 15/18
[52] U.S. Cl. ................................................... 277/118
[58] Field of Search ............... 277/105, 113, 117, 118, 277/119, 116.4, 116.6, 116.8, 142, 147, 191

[56] References Cited
U.S. PATENT DOCUMENTS

| 326,574 | 9/1885 | Mars | 277/105 |
| 774,402 | 11/1904 | Swain | 277/118 |

Primary Examiner—Robert I. Smith
Attorney, Agent, or Firm—Christel & Bean

[57] ABSTRACT

A packing gland assembly providing separate tightening of a packing seal in both the axial and radial directions. Tightening of the packing seal in the aforesaid directions is provided by a pair of concentric sleeves mounted about a shaft wherein the latter may experience either rotational or axial movement or both with respect to a housing surrounding the shaft. The packing seal is disposed on the shaft with one of its axial end faces abutting the housing with the other of its end faces abutting the inner sleeve. With the inner sleeve being selectively positioned in an axial direction, the axial pressure on the packing seal can be adjusted. In addition, a segmented ring is provided to encompass the packing seal to urge the latter into radial engagement with the shaft. The outer surface of the segmented ring is beveled to engage the outer sleeve in a wedge type of manner so that upon selected axial movement of the outer sleeve, the segmented ring adjustably tightens the packing seal against the shaft.

3 Claims, 7 Drawing Figures

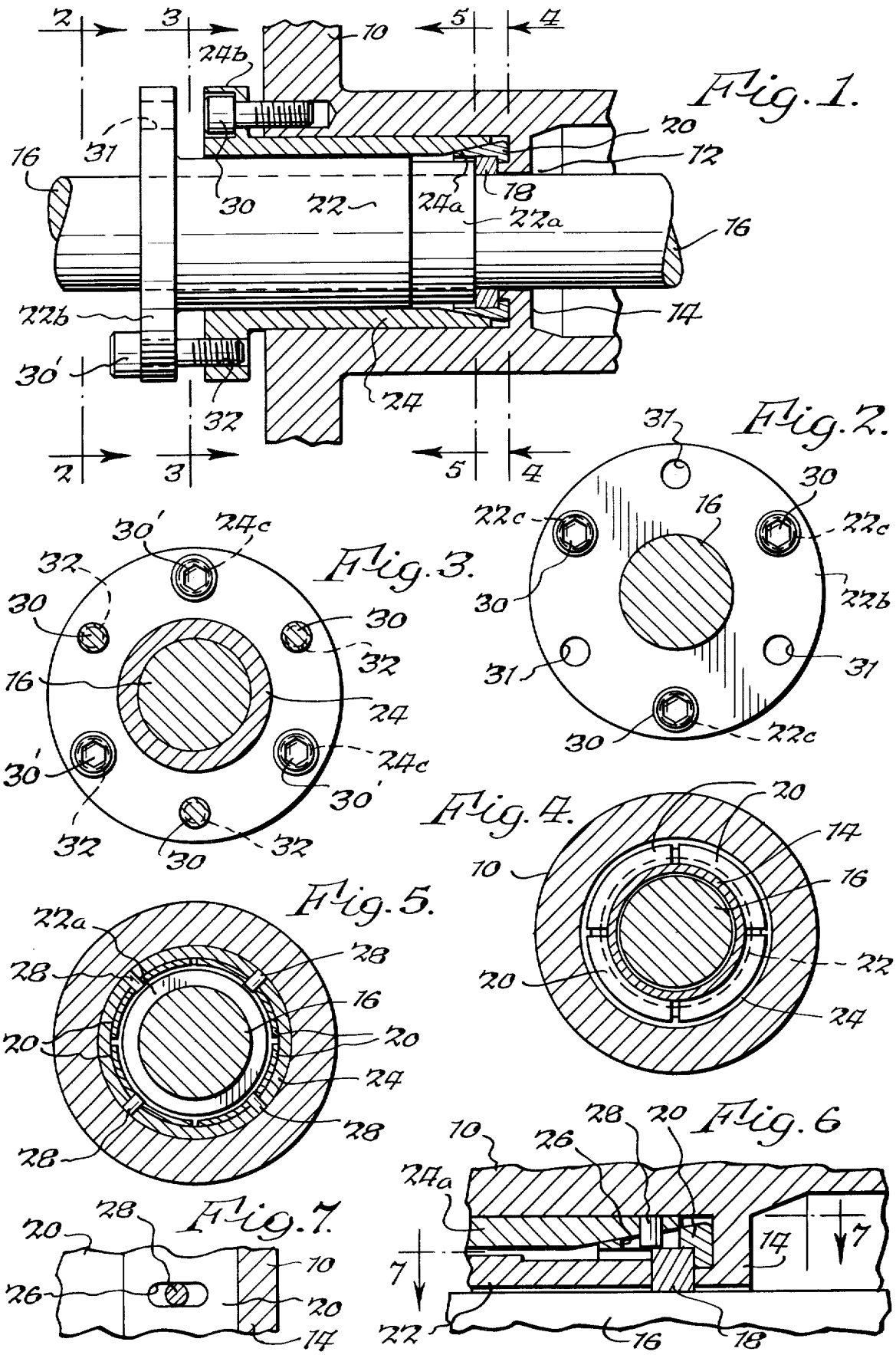

PACKING GLAND

THE BACKGROUND OF THE INVENTION

This invention relates generally to packing glands and the like, and more particularly, to a packing gland assembly utilized to seal movable shafts which undergo rotational or axial movement, or both, in a housing associated with pressurized fluid conditions on the order of, for example, 6000 psi.

In this regard, the packing gland assembly provided by the present invention may be appropriately adjusted in regard to the separate axial and radial loading on the gland so as to function in accordance with the particular pressures encountered. Necessarily, the packing seal must exert greater sealing pressure on a shaft associated therewith when subjected to higher fluid pressure conditions. In addition it is to be understood that the fluid pressures referred to hereinbelow include fluids in both the gaseous and liquid states.

One of the critical problems encountered in packing gland assemblies for use in the above type of application is that high fluid pressures can, in general, only be effectively sealed by the use of a plurality of packing glands or sealing rings. However, in using such a plurality of sealing rings on a rotating or axially sliding shaft, or a shaft undergoing both types of motion, more power than necessary is lost due to the additional friction surface area of the multiple seals than would be the case if a single sealing ring could be used in an effective manner. Although the present invention is capable of utilizing multiple sealing rings, it has been found that the individual tightening adjustment of a single sealing ring in both the axial and radial directions in most situations makes the use of multiple sealing rings unnecessary.

In addition, a good number of prior art packing gland assemblies include relatively complex components which make disassembly thereof relatively difficult. In this regard, the present invention seeks to overcome this shortcoming of the prior art also.

SUMMARY OF THE INVENTION

Accordingly, one object of the present invention is to provide a new and improved packing gland assembly for shaft members undergoing either rotational or axial movement, or both, in the presence of a potentially wide range of fluid pressure conditions wherein the sealing forces imparted to the packing gland can be adjusted in both the axial and radial directions from locations exterior of the packing gland directly to the sealing surfaces associated therewith.

Another object of the present invention is to provide an improved packing gland assembly wherein the power loss experienced by a shaft passing therethrough is minimized through the use of a single sealing ring or packing gland as opposed to the use of a plurality of sealing rings.

A further object of the present invention is to provide a new and improved packing gland assembly wherein adjustments to the mounted loading on the gland element may be made in an expeditious and exact manner.

Still another object of the present invention is to provide a new and improved packing gland assembly wherein disassembly thereof may be made in an uncomplicated manner.

In summary, the present invention provides a packing gland assembly for a shaft disposed in a housing associated with a pressurized fluid wherein the shaft may experience either rotational or axial movement, or both. A sealing ring or packing gland is mounted on the shaft so that one of its axial end faces abuts an inwardly extending shoulder portion of the housing at a point adjacent to the circumferential surface of the shaft. The other axial end face of the sealing ring abuts against the end face of a first axially extending sleeve mounted about the aforesaid shaft. This sleeve is selectively positioned in an axial sense so as to adjustably urge the packing gland or seal against the shouldered portion of the housing whereby axial pressure applied to the seal may be determined.

A segmented ring is disposed about the outer radial surface of the packing gland so as to urge the latter against the shaft with various degrees of sealing pressure. A second axially extending sleeve member is concentrically disposed about the first sleeve member and being movable in a longitudinal direction abuts the outer surface of the segmented ring. A wedge-type of interface is provided between the outer surface of the segmented ring and the second sleeve. In this manner, selected positioning of the second sleeve results in corresponding radial adjustments, through the segmented ring, of the pressure exerted by the packing gland on the shaft.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a fragmentary, longitudinal view, partly in section, showing the packing gland assembly of the present invention incorporated into a housing structure through which a movable shaft passes.

FIG. 2 is a transverse end view showing the flanged portion of the inner sleeve of the present invention as taken about on line 2—2 of FIG. 1.

FIG. 3 is a view similar to FIG. 2 showing the flanged portion of the outer sleeve of the present invention as taken about on line 3—3 of FIG. 1.

FIG. 4 is a transverse view, partly in section, of the segmented ring structure as taken about on line 4—4 of FIG. 1.

FIG. 5 is a view similar to FIG. 4, being also partly in section, showing the end face of the inner sleeve member as taken about on line 5—5 of FIG. 1.

FIG. 6 is a fragmentary, enlarged detail view, partly in section, showing a pinned type of engagement between the outer sleeve and segmented ring of the present invention.

FIG. 7 is a fragmentary view, partly in section, of the segmented ring as taken about on line 7—7 of FIG. 6.

DETAILED DESCRIPTION OF A PREFERRED EMBODIMENT

Referring now in detail to the illustrative embodiment depicted in the accompanying drawings, there is shown in FIG. 1, in fragmentary form, a housing 10 associated with a pressurized fluid, as for example encountered in various types of liquid and gaseous valve structures. Housing 10 defines a passage 12 therethrough which includes a longitudinal axis symmetrically disposed with respect to the inwardly projecting shoulder portion 14 of the housing. A shaft means 16 is co-axially mounted in passage 12 for movement therein. It is to be understood that the present invention may accommodate either rotational or axial movement on the part of shaft 16 or any type of compound movement involving both axial and rotational movements.

A packing gland means forming the present invention is operable with respect to housing 10 and shaft 16 so as to accommodate the aforesaid movements of shaft 16 while sealing against the flow of pressurized fluid between the housing and the shaft. As stated, such pressurized fluid may be in either the gaseous or liquid states in pressures ranging up to, for example, the order of 6000 psi.

The packing gland assembly includes a sealing ring 18 and a segmented ring 20 encompassing sealing ring 18. As is clearly apparent in FIGS. 4 and 5, the segmented ring 20 includes four segments symmetrically disposed about sealing ring 18 for adjustable radial movement thereagainst.

In addition to the foregoing elements, a first sleeve 22 is concentrically mounted on shaft 16 for axial movement therealong. Sleeve 22 includes a right hand axial end face as viewed in FIG. 1 which abuts the adjacent end face of sealing ring 18. A reduced diameter, shouldered portion 22a is provided on the end of sleeve 22 adjacent to sealing ring 18 so as to accommodate assembly of the segmented ring 20. The left hand end of sleeve 22 includes flange 22b as viewed in FIG. 2 with circumferentially spaced apertures therein for purposes to be described hereinbelow. In addition to sleeve 22, a second sleeve 24 is provided concentrically about sleeve 22. Sleeve 24 includes an outwardly tapering, inner end surface 24a as seen in FIG. 1 which slidingly engages the inwardly tapering outer surface of segmented ring 20. The left hand end of sleeve 24 as viewed in FIGS. 1 and 3 also includes a flanged collar 24b with a plurality of apertures therein for purposes to be further described.

As shown in detail in FIGS. 6 and 7, the segments of segmented ring 20 include longitudinally oriented slots 26. End portion 24a of sleeve 24 includes radially inwardly extending pins 28 which are received within corresponding slots 26 so as to preclude relative rotational movement between the segments of ring 20 and sleeve end portion 24a.

In adjusting the loading imparted to the sealing ring 18 shown in FIG. 1, it is to be appreciated that the axial end face of sleeve portion 22a functions to adjustably urge sealing ring 18 against portion 14 of the housing. In addition, the segments of ring 20 are restrained against axial movement to the right in FIG. 1 by housing portion 14 and accordingly, due to the wedge type of engagement with sleeve portion 24a, the segments of ring 20 undergo various degrees of radial movement corresponding to axial movement of sleeve 24 so as to impart various degrees of loading on sealing ring 18 in a radial direction.

Although the embodiment in FIG. 1 shows a circular shaft and corresponding packing gland assembly or circular configuration, it is anticipated that other cross sectional configurations of shafts or shaft stems could be adapted for use with the present invention. For example, shaft 16 could be square in cross section as would sealing ring 18 and sleeves 22 and 24 whereby the loading imparted to a sealing ring by an equivalent sleeve 24 and segmented ring 20 would be in a direction transverse to such a shaft as opposed to the radial (transverse) loading imparted by the segmented ring and shaft 24 in FIG. 1.

Flange 24b includes three symmetrically disposed apertures 24c which receive bolt means 30. The bolt means 30 are engaged in housing 10 in a manner to variably adjust the axial position of sleeve 24 and necessarily the radial loading on ring 20 and sealing ring 18 against shaft 16. Flange 22b in turn includes three symmetrically disposed apertures 22c which also receive bolt means for engagement in threaded apertures 32 in flange 24b. Sleeve 24 is positioned in an axial sense through adjustment of bolt means 30 associated with flange 24b for such purposes. Access to the bolt means in flange 24b is provided through clearance holes 31 in flange 22b, holes 31 being aligned with apertures 24c. Sleeve 22 is positioned in an axial sense to adjust the axial loading on sealing ring 18. This is accomplished by appropriately adjusting the bolt means 30¹ associated with flange 22b. As is fully apparent to one skilled in the art, the segments of ring 20 are precluded from undergoing relative rotation with respect to housing 10 by the fixed nature of pins 28 and sleeve 24 with respect to the housing 10.

By utilization of the present invention as described hereinabove, a packing gland assembly is provided to separately adjust the transverse and axial loading on a sealing ring so that it may more efficiently operate over a wide range of pressure conditions. Although not shown, additional sealing rings 18 in an axial series could be employed if deemed necessary. In this regard, it is to be noted that sleeve 22 can be removed without the necessity of full disassembling sleeve 24. It is to be further understood that the threaded holes 32 in flange 24b could be used with jack screws to assist in removal of sleeve 24 from the housing during any disassembly of the entire sealing assembly. In this regard, the jack screws would be engaged through threaded openings 32 to abut housing 10 and urge sleeve 24 to the left as viewed in FIG. 1.

From the foregoing, it is apparent that the objects of the present invention have been fully accomplished. As a result of this invention, a packing gland assembly is provided which permits individual tightening of the packing gland or sealing ring in both the axial and radial directions. In addition, the sealing or loading forces imparted to the sealing ring can be applied through the pair of concentric sleeves described hereinabove from exterior locations directly to the sealing surfaces. Furthermore, in the case of a rotating or sliding shaft, less power will be required to move the shaft where only one ring of packing is used versus multiple rings, although the present invention still includes the ability to use multiple rings if deemed necessary.

Having thus described and illustrated a preferred embodiment of my invention, it will be understood that such description and illustration is by way of example only and such modifications and changes as may suggest themselves to those skilled in the art are intended to fall within the scope of the present invention as limited only by the appended claims.

I claim:

1. In combination, a housing associated with a pressurized fluid, and defining a passage having a longitudinal axis therethrough, a shaft means having a longitudinal axis and being disposed in said passage in a co-axial manner for movement therein, packing gland means disposed in said passage intermediate to said housing and said shaft means in a manner sealing against flow of said fluid between said housing and said shaft means, said packing gland means comprising sealing ring means disposed intermediate to said shaft means and said housing, means for selectively applying pressure on said sealing ring means in an axial direction with respect to said shaft, said means comprising a sleeve means mounted about said shaft means and being axially engagable against said sealing ring means in a manner so as to exert a predetermined amount of pressure thereon, and means for selectively applying pressure on said sealing ring in a direction transverse to said shaft, said latter means including a segmented ring means encompassing said sealing ring means and sleeve means for selectively urging said segmented ring into a predetermined degree of engagement with said sealing ring means so that the latter is urged against said shaft means in a direction transverse thereto, said latter sleeve means being disposed about said shaft means and being movable therealong to engage said segmented ring means in a camming manner so as to selectively urge the latter into engagement with said sealing ring means wherein said sleeve means for engaging said segmented ring means and the latter means have a wedge type of engagement with respect to one another so that upon axial movement of said sleeve means said segmented ring means undergoes radial movement with respect to said sealing ring means and said shaft means and at least certain of the the segments of said segmented ring means include openings in the sidewalls thereof with pin means, fixed with respect to said housing, being received in said openings so as to prevent relative rotation of said segments with respect to said sleeve means engaged therewith.

2. The combination as set forth in claim 1 wherein said sleeve means for applying pressure on said sealing ring means in an axial direction is concentrically disposed within said sleeve means engaging said segmented ring means and said latter sleeve means includes a flange overlying a wall portion of said housing with adjustable connection means extending between said flange and said housing wall for selectively urging said flange and associated sleeve means against said segmented ring and wherein said sleeve means for applying pressure on said sealing ring means in an axial direction with respect to said shaft means includes a flange and adjustable connection means associated therewith for selectively urging said sleeve means associated therewith into engagement with said sealing ring means.

3. The combination as set forth in claim 1 wherein said shaft means, said sealing ring means, said segmented ring means and said sleeve means are circular in transverse cross section and co-axially disposed with respect to one another so that said segmented ring means engages said sealing ring means in a radially transverse direction with respect to said shaft means.

* * * * *